(12) United States Patent
Xu et al.

(10) Patent No.: US 8,483,431 B2
(45) Date of Patent: Jul. 9, 2013

(54) SYSTEM AND METHOD FOR ESTIMATING THE CENTERS OF MOVING OBJECTS IN A VIDEO SEQUENCE

(75) Inventors: Ning Xu, Irvine, CA (US); Yeong-Taeg Kim, Irvine, CA (US)

(73) Assignee: Samsung Electronics Co., Ltd., Suwon, Kyungki-Do (KR)

( * ) Notice: Subject to any disclaimer, the term of this patent is extended or adjusted under 35 U.S.C. 154(b) by 1050 days.

(21) Appl. No.: 12/127,738

(22) Filed: May 27, 2008

(65) Prior Publication Data

US 2009/0297052 A1 Dec. 3, 2009

(51) Int. Cl.
*G06K 9/00* (2006.01)

(52) U.S. Cl.
USPC ......................................................... 382/103

(58) Field of Classification Search
None
See application file for complete search history.

(56) References Cited

U.S. PATENT DOCUMENTS

| | | | |
|---|---|---|---|
| 5,111,516 A | | 5/1992 | Nakano et al. |
| 5,144,568 A | * | 9/1992 | Glover .......................... 708/202 |
| 5,548,661 A | | 8/1996 | Price et al. |
| 5,594,469 A | | 1/1997 | Freeman et al. |
| 5,790,692 A | | 8/1998 | Price et al. |
| 6,035,067 A | * | 3/2000 | Ponticos ....................... 382/226 |
| 6,445,409 B1 | * | 9/2002 | Ito et al. ........................ 348/155 |
| 6,647,131 B1 | | 11/2003 | Bradski |
| 7,099,505 B2 | | 8/2006 | Li et al. |
| 7,199,803 B2 | | 4/2007 | Shin et al. |
| 7,200,266 B2 | | 4/2007 | Ozer et al. |
| 7,245,767 B2 | | 7/2007 | Moreno et al. |
| 7,274,800 B2 | * | 9/2007 | Nefian et al. .................. 382/103 |
| 7,308,112 B2 | * | 12/2007 | Fujimura et al. .............. 382/103 |
| 7,312,788 B2 | * | 12/2007 | Fleischmann et al. ........ 345/157 |
| 7,363,108 B2 | * | 4/2008 | Noda et al. .................... 700/245 |
| 7,460,690 B2 | * | 12/2008 | Cohen et al. .................. 382/103 |
| 7,516,888 B1 | * | 4/2009 | Kundu et al. .................. 235/383 |

OTHER PUBLICATIONS

A. Bobick, J. Davis, "Real-time recognition of activity using temporal templates," wacv, pp. 39, Third IEEE Workshop on Applications of Computer Vision (WACV '96), 1996.*
Ramesh Jain, Rangachar Kasturi, Brian G. Schunck Published by McGraw-Hill, Inc., Chapter 2, ISBN 0-07-032018-7, 1995.*
R.O. Duda, P.E. Hart, "Use of the Hough Transformation to Detect Lines and Curves in Pictures", Communications of the ACM 15 (1972) 11-15.
D. H. Ballard, "Generalizing the Hough transform to detect arbitrary shapes." Pattern Recognition, v. 13, n. 2, pp. 111-122, 1981.

(Continued)

*Primary Examiner* — Claire X Wang
*Assistant Examiner* — Thomas A James

(57) ABSTRACT

Systems and methods for estimating the centers of moving objects in a video sequence are disclose. One embodiment is a method of defining one or more motion centers in a video sequence, the method comprising receiving a video sequence comprising a plurality of frames, receiving a motion history image for each of a subset of the plurality of frames based on the video sequence, identifying, through use of the motion history image, one or more data segments having a first orientation, wherein each data segment having the first orientation has a start location and a length, identifying, one or more data segments having a second orientation, wherein each element of a data segment having the second orientation is associated with a data segment having the first orientation, and defining a corresponding motion center for one or more of the indentified data segments having the second orientation.

37 Claims, 8 Drawing Sheets

OTHER PUBLICATIONS

T. J. Atherton and D. J. Kerbyson, "Size invariant circle detection", Image and Vision Computing, vol. 17, pp. 795-803, 1999.

E. Borenstein, E. Sharon, and S. Ulman. Combining top-down and bottom-up segmentation. *CVPR POCV*, Washington, 2004.

E. Borenstein and S. Ulman. Class-specific, top-down segmentation. In *ECCV* (2), pp. 109-124, 2002.

E. Borenstein and J. Malik. Shape guided object segmentation. In *IEEE Conference on Computer Vision and Pattern Recognition*, pp. 969-976, 2006.

Yuri Boykov, Olga Veksler, and Ramin Zabih. Fast approximate energy minimization via graph cuts. *IEEE Transactions on Pattern Analysis and Machine Intelligence*, Nov. 2001.

Piotr Dollar, Zhuowen Tu, and Serge Belongie. Supervised learning of edges and object boundaries. *IEEE Conference on Computer Vision and Pattern Recognition*, Jun. 2006.

Pedro F. Felzenszwalb. Efficient graph-based image segmentation. In *International Journal of Computer Vision*, Sep. 2004.

J. Friedman, T. Hastie, R. Tibshirani. Additive logic regression: a statistical view of boosting. *Annals of Statistical*, 2000.

Frank R. Kschischang, Brendan J. Frey, and Hans-Andrea Loeliger. Factor graphs and the sun-product algorithm. *IEEE Transactions on Information Theory*, vol. 47(2): 498-519, Feb. 2001.

L. Liu and S. Sclaroff. Region segmentation via deformable model-guided split and merge. *ICCV*(1), 2001.

Jordan Reynolds and Kevin Murphy. Figure-ground segmentation using a hierarchical conditional random field. In *Fourth Canadian Conference on Computer and Robot Vision*, pp. 175-182, 2007.

J. Shi and J. Malik. Normalized cuts and image segmentation. In *IEEE Conference on Computer Vision and Pattern Recognition*, pp. 731-737, 1997.

Antonio Torralba, Kevin P. Murphy, and William T. Freeman. Sharing visual features for multiclass and multiview object detection. *IEEE Transactions on Pattern Analysis and Machine Intelligence*, vol. 29, No. 5, May 2007.

Z. Tu. Probabilistic boosting-tree: Learning discriminative models for classification, recognition, and clustering. *ICCV*, 2005.

Y. Weiss. Segmentation using eigenvectors: A unifying view. In *International Conference on Computer Vision* (2), pp. 975-982, 1999.

J. Winn, A. Criminisi, and T. Minka. Object categorization by learned universal visual dictionary. *IEEE Conference on Computer Vision and Pattern Recognition*, 2005.

\* cited by examiner

|    | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |    |
|----|---|---|---|---|---|---|---|---|---|---|----|----|----|----|----|----|----|----|----|----|----|----|----|----|----|
| 0  | 0 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  | 0  |
| 1  | 1 | 1 | 1 | 0 | 0 | 0 | 0 | 0 | 0 | 0 | 0  | 0  | 1  | 1  | 1  | 1  | 0  | 0  | 0  | 0  | 0  | 0  | 0  | 0  | 0  |
| 2  | 0 | 0 | 0 | 0 | 1 | 1 | 1 | 0 | 0 | 1 | 1  | 1  | 1  | 1  | 1  | 1  | 1  | 0  | 1  | 1  | 1  | 0  | 0  | 0  | 1  |
| 3  | 0 | 0 | 0 | 0 | 0 | 0 | 1 | 1 | 1 | 1 | 0  | 1  | 1  | 1  | 1  | 1  | 1  | 1  | 1  | 1  | 0  | 0  | 0  | 0  | 1  |
| 4  | 0 | 0 | 0 | 1 | 1 | 1 | 1 | 1 | 1 | 0 | 0  | 0  | 1  | 1  | 1  | 1  | 0  | 0  | 0  | 0  | 0  | 0  | 0  | 0  | 1  |
| 5  | 0 | 0 | 0 | 0 | 0 | 0 | 1 | 1 | 1 | 1 | 1  | 0  | 0  | 0  | 0  | 0  | 1  | 1  | 0  | 0  | 0  | 0  | 0  | 0  | 1  |
| 6  | 0 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  | 1  |
| 7  | 0 | 0 | 0 | 0 | 0 | 0 | 0 | 1 | 1 | 1 | 1  | 1  | 0  | 0  | 0  | 0  | 0  | 0  | 0  | 0  | 1  | 0  | 0  | 0  | 0  |
| 8  | 0 | 0 | 0 | 0 | 0 | 1 | 1 | 1 | 1 | 1 | 0  | 0  | 1  | 0  | 0  | 0  | 0  | 0  | 1  | 0  | 0  | 0  | 0  | 0  | 1  |
| 9  | 0 | 0 | 0 | 0 | 1 | 1 | 1 | 1 | 1 | 1 | 1  | 1  | 1  | 1  | 0  | 0  | 0  | 0  | 0  | 0  | 0  | 0  | 0  | 0  | 1  |
| 10 | 0 | 0 | 0 | 0 | 0 | 0 | 0 | 0 | 0 | 0 | 0  | 0  | 0  | 0  | 0  | 0  | 0  | 1  | 0  | 0  | 0  | 0  | 1  | 0  | 0  |

FIG. 6

SYSTEM AND METHOD FOR ESTIMATING THE CENTERS OF MOVING OBJECTS IN A VIDEO SEQUENCE

BACKGROUND

1. Field

The disclosure relates to digital video processing, and in particular, to estimating the centers of moving objects in a video sequence.

2. Brief Description of the Related Technology

One method of digital video processing attempts to find the motion centers of one or more moving objects in a video sequence. Prior methods of finding the motion centers involve complicated processing of a sequence of video frames. These involve storing many frames of image data and are not efficient enough to enable real-time estimation.

SUMMARY OF CERTAIN INVENTIVE ASPECTS

One aspect of the development is a method of defining one or more motion centers in a video sequence, the method comprising receiving a video sequence comprising a plurality of frames, receiving a motion history image for each of a subset of the plurality of frames based on the video sequence, identifying, through use of the motion history image, one or more data segments having a first orientation, wherein each data segment having the first orientation has a start location and a length, identifying, one or more data segments having a second orientation, wherein each element of a data segment having the second orientation is associated with a data segment having the first orientation, and defining a corresponding motion center for one or more of the indentified data segments having the second orientation.

Another aspect of the development is a system for defining one or more motion centers in a video sequence, the system comprising an input configured to receive a video sequence comprising a plurality of frames, a motion history image module configured to receive a motion history image for each of a subset of the plurality of frames based on the video sequence, a first segmentation module configured to identify, through use of the motion history image, one or more data segments having a first orientation, wherein each data segment having the first orientation has a start location and a length, a second segmentation module configured to identify one or more data segments having a second orientation, wherein each element of a data segment having the second orientation is associated with a data segment having the first orientation, and a motion center module configured to define a corresponding motion center for one or more of the indentified data segments having the second orientation.

Another aspect of the development is a system for defining one or more motion centers in a video sequence, the system comprising means for receiving a video sequence comprising a plurality of frames, means for receiving a motion history image for each of a subset of the plurality of frames based on the video sequence, means for identifying, through use of the motion history image, one or more data segments having a first orientation, wherein each data segment having the first orientation has a start location and a length, means for identifying, one or more data segments having a second orientation, wherein each element of a data segment having the second orientation is associated with a data segment having the first orientation, and means for defining a corresponding motion center for one or more of the indentified data segments having the second orientation.

Still another aspect of the development is a programmable storage device comprising code which, when executed, causes a processor to perform a method of defining one or more motion centers in a video sequence, the method comprising receiving a video sequence comprising a plurality of frames, receiving a motion history image for each of a subset of the plurality of frames based on the video sequence, identifying, through use of the motion history image, one or more data segments having a first orientation, wherein each data segment having the first orientation has a start location and a length, identifying, one or more data segments having a second orientation, wherein each element of a data segment having the second orientation is associated with a data segment having the first orientation, and defining a corresponding motion center for one or more of the indentified data segments having the second orientation.

BRIEF DESCRIPTION OF THE DRAWINGS

FIG. 6 is a diagram of a binary map which may be utilized in performing one or more of the methods described herein.

FIG. 8a is an exemplary row of a motion history image.

FIG. 8b is diagram which represents the row of the motion history image of FIG. 8a as monotonic segments.

FIG. 8c is a diagram illustrating two segments derived from the row of the motion history image of FIG. 8a.

FIG. 8d is a diagram illustrating a plurality of segments derived from an exemplary motion history image.

DETAILED DESCRIPTION OF CERTAIN INVENTIVE EMBODIMENTS

The following detailed description is directed to certain specific sample aspects of the development. However, the development can be embodied in a multitude of different ways as defined and covered by the claims. In this description, reference is made to the drawings wherein like parts are designated with like numerals throughout.

Computer vision is the science and technology of automated image analysis enabling machines to see and analyze image data for various pieces of information. The image data can take many forms, such as single images, a video sequence, views from multiple cameras, or multi-dimensional data such as that received from a medical scanner.

A digital image is produced by one or several image sensors which, besides various types of light-sensitive cameras, include range sensors, tomography devices, radar, ultra-sonic cameras, or other imaging devices. Depending on the type of sensor, the resulting image data is an ordinary 2D image, a 3D volume, or an image sequence. The pixel values typically correspond to light intensity in one or several spectral bands (e.g., gray images or color images), but can also be related to various physical measures, such as depth, absorption or reflectance of sonic or electromagnetic waves, or nuclear magnetic resonance. As used herein, digital image data (or image data) is defined to include any of the forms of visual images or non-visual images known to skilled technologists.

In some aspects, computer vision seeks to apply the theories and models of computer vision to perform various tasks in computer vision systems. Examples of applications of computer vision systems include, for example, process control (e.g. an assembly line robot), visual surveillance for detecting events or presence of people or things, identifying and organizing image information contained in databases, and human machine interaction.

One embodiment attempts to find one or more motion centers of moving objects in a video sequence. In one embodiment, the input is a sequence of digital video frames and the output is a series of motion center locations. Each motion center location is associated a particular frame and an object in the video. The motion centers can be used to calculate a trajectory of objects, such as a human hand, to enable a new class of products which can intelligently interact with a user via an attached camera.

System Overview

Figure 1:
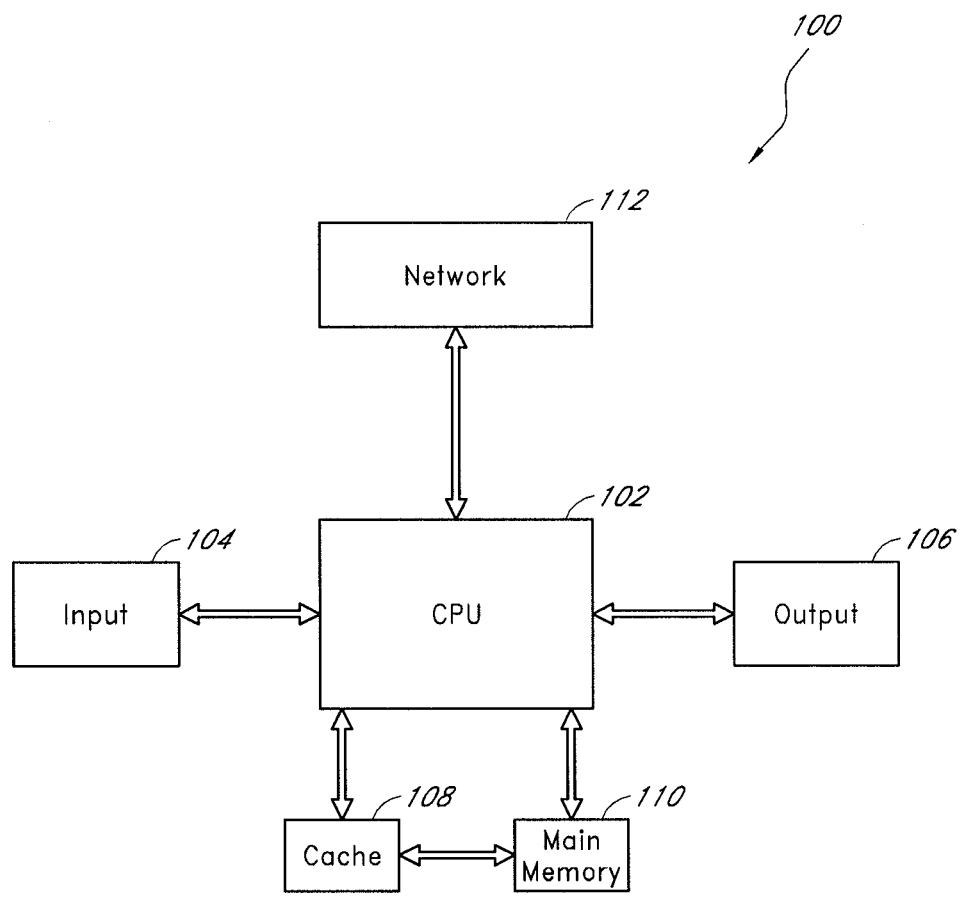
FIG. 1 is a functional block diagram of a system that may be configured to perform one or more of the methods disclosed herein.

FIG. 1 is a functional block diagram of a system capable of implementing the methods disclosed herein. The system 100 comprises an input 104, an output 106, a central processing unit 102, a cache 108, a main memory 110, and is connected to a network 112. The system 100 may be embodied in, for example, a personal computer or a dedicated processing unit for video analysis. The input 104 is connected to and configured to provide information to the central processing unit 102 and may embody, for example, a keyboard, a mouse, a video camera, a microphone, or other input device. The input 104 may be configured to receive information from a user, or from any other source outside the system. Similarly, the output 106 is connected to and configured to provide information from the central processing unit 102 and may embody, for example, a monitor, speakers, or an alarm system. The output 106 may be configured to provide information to a user, or to other source outside the system. The central processing unit 102 may be any conventional general purpose single- or multi-chip microprocessor such as a Pentium® processor, Pentium II® processor, Pentium III® processor, Pentium IV® processor, Pentium® Pro processor, a 8051 processor, a MIPS® processor, a Power PC® processor, or an ALPHA® processor. In addition, the processing unit 102 may be any conventional special purpose microprocessor such as a digital signal processor. In the embodiment of FIG. 1, the central processing unit 102 is connected to both a cache 108 and a main memory 110. The cache 108 and the memory 110 may be configured to store, among other things, instruction modules, video data, and estimated motion centers. Both the cache 108 and main memory 110 are connected to each other and may embody electronic circuitry that allows information, typically computer data, to be stored and retrieved. The cache 108 or main memory 110 may also be external devices or systems, such as, for example, disk drives or tape drives. The cache 108 or main memory 110 may also comprise fast semiconductor storage (chips), such as, for example, Random Access Memory (RAM) or various forms of Read Only Memory (ROM), which are directly connected to the central processing unit 102. Other types of memory that can comprise the cache 108 or the main memory 110 include bubble memory and core memory. In some embodiments, the cache 108 is configured to be accessed faster than the main memory 110. Although a fast access speed is a desirable memory property, there is a trade-off between cost and access speed. Thus, in many cases, the cache 108 comprises a form of memory which is more expensive per storage unit (e.g., per megabyte) and thus has less storage capacity than the main memory 110, which comprises a form of memory which is less expensive per storage unit.

In general, the word module, as used herein, refers to logic embodied in hardware or firmware, or to a collection of software instructions, possibly having entry and exit points, written in a programming language, such as, for example, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. Generally, the modules described herein refer to logical modules that may be combined with other modules or divided into sub-modules despite their physical organization or storage.

The system 100 is generally controlled and coordinated by server and/or desktop computer operating system software, such as the Windows 95, 98, NT, 2000, XP, Vista, Linux, SunOS, Solaris, PalmOS, Blackberry OS, or other compatible operating systems. In Macintosh systems, the operating system may be any available operating system, such as MAC OS X. In other embodiments, the system 100 may be controlled by a proprietary operating system. Conventional operating systems control and schedule computer processes for execution, perform memory management, provide file system, networking, and I/O services, and provide a user interface, such as a graphical user interface ("GUI"), among other things.

In the embodiment of FIG. 1, the system 100 may be in communication with a network 112, such as any combination of one or more LANs, WANs, or the Internet, for example, via a wired connection, wireless connection, or combination of wired and wireless connections. The network may communicate with various computing devices and/or other electronic devices via wired or wireless communication links. For example, a data stream may be received from a network and comprise data, such as web or email data, for example, transmitted from one or more device across the Internet.

Figure 2:
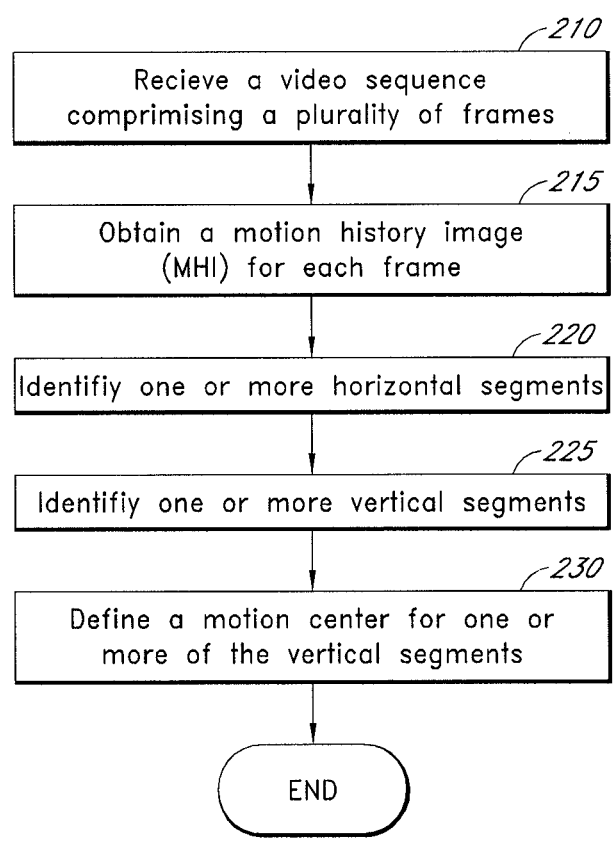
FIG. 2 is a flowchart illustrating one embodiment of a method of defining one or more motion centers associated with objects in a video sequence.

FIG. 2 is a flowchart illustrating one embodiment of a method of defining one or more motion centers associated with objects in a video sequence. The method 200 begins, in block 210, by receiving a video sequence comprising a plurality of frames. The video sequence may be received, for example, via the input 104, the cache 108, the main memory 110, or the network 112. In one embodiment, a video camera is configured to provide a video stream to the system. In some embodiments of the method, the received video sequence is not what is recorded by the video camera, but a processed version of the video camera data. For example, the video sequence may comprise a subset of the video camera data, such as every other frame or every third frame. In other embodiments, the subset may comprise selected frames as processing power permits. In general, a subset may include only one element of the set, at least two elements of the set, at least three elements of the set, a significant portion (e.g. at least 10%, 20%, 30%) of the elements of the set, a majority of the elements of the set, nearly all (e.g., at least 80%, 90%, 95%) of the elements of the set, or all of the elements of the set. Additionally, the video sequence may comprise the video camera data subjected to image and/or video processing techniques such as filtering, desaturation, and other image processing techniques known to those skilled in the art.

Next, in block 215, a motion history image (MHI) is obtained for each frame. In some embodiments, a MHI is obtained for a subset of the frames. A motion history image is a matrix, similar to image data, which represents motion that has occurred in previous frames of the video sequence. For the first frame of the video sequence, a blank image may be considered the motion history image. As this may be by definition, the blank image may not be calculated or obtained explicitly. Obtaining a MHI may comprise calculating the motion history image using known techniques or new methods. Alternatively, obtaining a MHI may comprise receiving the motion history image from an outside source, such as a processing module of a video camera, or retrieved from memory along with the video sequence. One method of obtaining a motion history image will be described with respect to FIG. 3, however, other methods may be used.

In block 220, one or more horizontal segments are identified. In general, the segments may be in a first orientation, which is not necessarily horizontal. In one embodiment, the one or more horizontal segments will be identified from the motion history image. For example, the horizontal segments may comprise sequences of pixels of the motion history image that are above a threshold. The horizontal segments may also be indentified through other methods of analyzing the motion history image. Next, in block 225, one or more vertical segments are identified. In general, the segments may be in a second orientation, which is not necessarily vertical. Although one embodiment identifies horizontal segments, then vertical segments, another embodiment may indentify vertical, then horizontal segments. The two orientations may be perpendicular, or, in other embodiments, they may not be. In some embodiments, the orientations may not be aligned with the borders of the frame. The vertical segments may comprise, for example, vectors wherein each element corresponds to a horizontal segment that is greater than a specific length. It is important to realize that the nature of the horizontal segments and the vertical segments may differ. For example, in one embodiment, the horizontal segments comprise elements that correspond to pixels of the motion history image, wherein the vertical segments comprise elements that correspond to horizontal segments. There may be two vertical segments that correspond to the same row of the motion history image, when, for example, two horizontal segments are in the row, and each of the two vertical segments is associated with a different horizontal segment in that row.

Finally, in block 230, a motion center is defined for one or more of the vertical segments. As the vertical segments are associated with one or more horizontal segments, and the horizontal segments are associated with one or more pixels, transitively, each vertical segment is associated with a collection of pixels. The pixel locations can be used to define a motion center, which is itself a pixel location, or a location within an image between pixels. In one embodiment, the motion center is a weighted average of the pixel locations associated with the vertical segment. Other methods of finding a "center" of the pixel locations may be used. The motion center may not necessarily correspond to a pixel location identified by the vertical segment. For example, the center of a crescent-shaped pixel collection may be outside of the boundaries defined by the pixel collection.

The defined motion centers may then be stored, transmitted, displayed, or in any other way, output from the system. The motion centers may also be transferred to another functional part of the system for further processing. For example, the processing may include calculating trajectories of the objects to be used as part of a human-machine interface. The motion centers may be stored in, among other places, the cache 108 or main memory 110. They may be transmitted via, for example, the network 112. Alternatively, the motion centers may be displayed on the output 106.

Motion History Image

Figure 3:
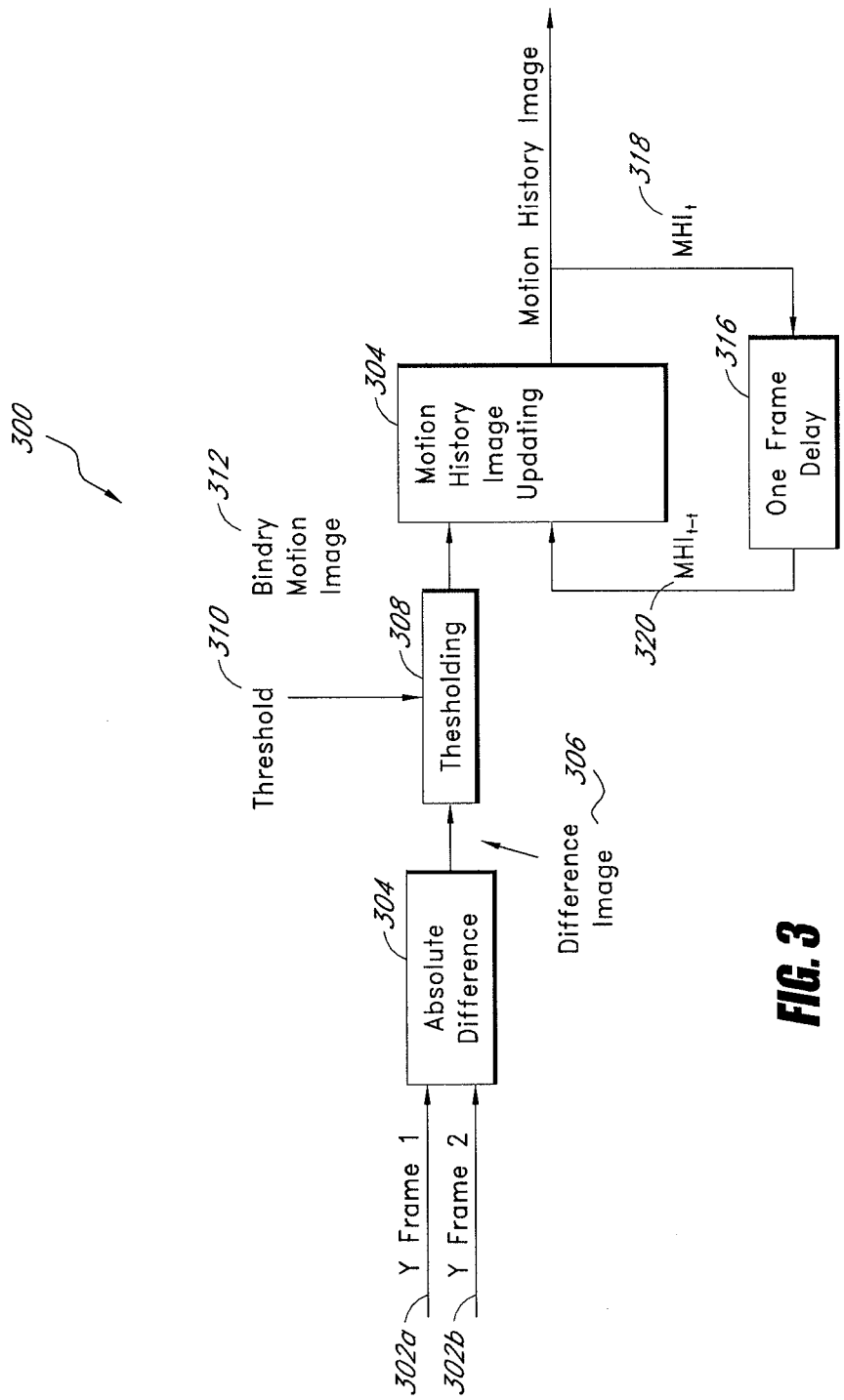
FIG. 3 is a functional block diagram of an embodiment of a system to define a motion history image (MHI).

FIG. 3 is a functional block diagram illustrating a system capable of computing a motion history image (MHI). Two video frames 302a, 302b are input into the system 300. The video frames 302 may be the intensity values associated with a first frame of a video sequence and a second frame of a video sequence. The video frames 302 may be the intensity of a particular color value. The video frames 302, in some embodiments, are consecutive frames in the video sequence. In other embodiments, the video frames are non-consecutive so as to more quickly, and less accurately, calculate a motion history image stream. The two video frames 302 are processed by an absolute difference module 304. The absolute difference module 304 produces an absolute difference image 306, wherein each pixel of the absolute difference image 306 is the absolute value of the difference between the pixel value at the same location of the first frame 302a and the pixel value at the same location of the second frame 302b. The absolute difference image is processed by a thresholding module 308, which also takes a threshold 310 as an input.

Figure 4:
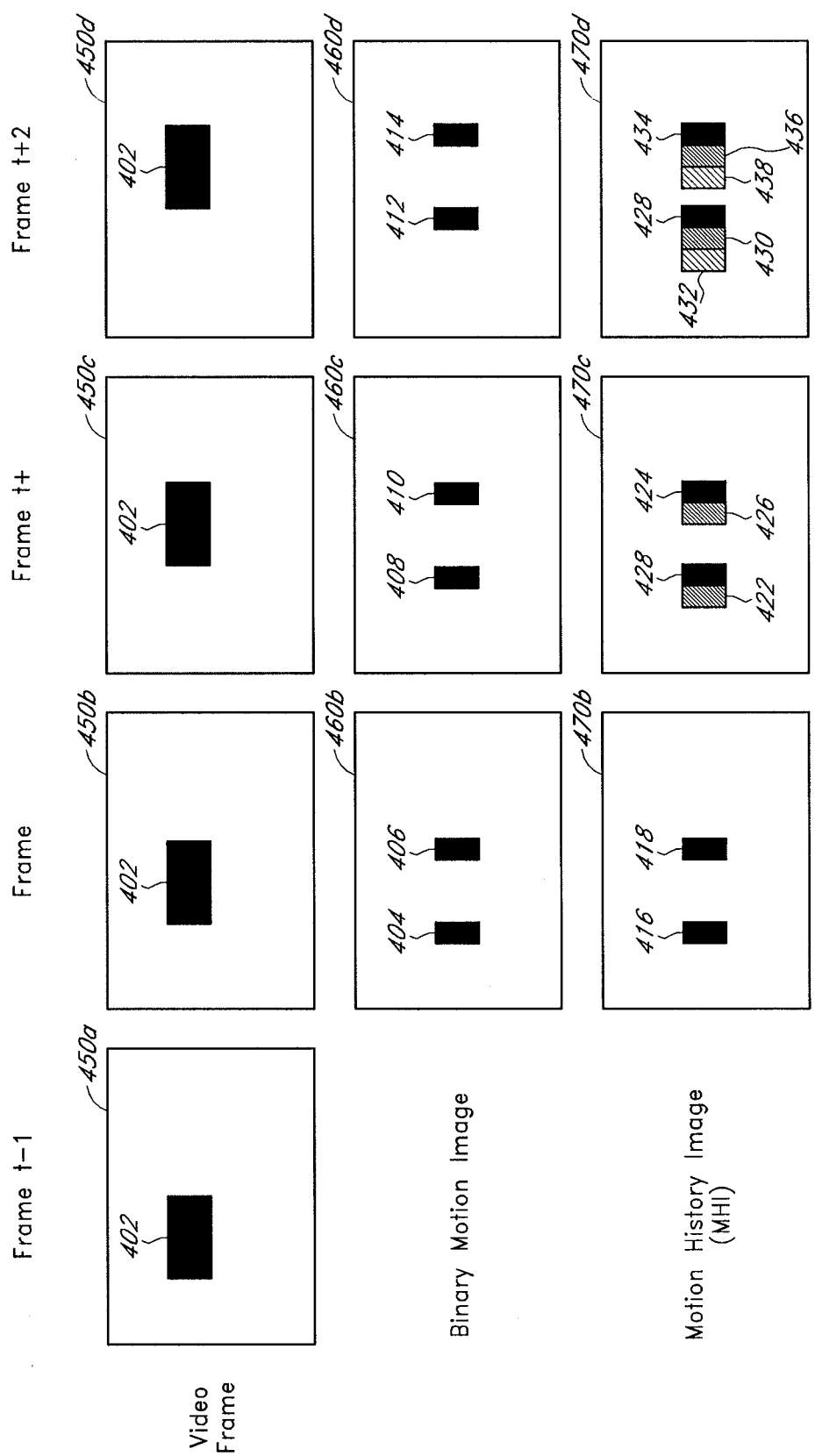
FIG. 4 is a diagram of a collection of frames of a video sequence, the associated binary motion images, and the motion history image of easy frame.

In some embodiments, the threshold 310 is fixed. The thresholding module 308 applies the threshold 310 the absolute difference image 106 by produce a binary motion image 112. The binary motion image is set to a first value if the absolute difference image 106 is above the threshold 110 and is set to a second value if the absolute difference image 106 is below the threshold 110. In some embodiments, the pixel values of the binary motion image may be either zero or one. In other embodiments, the pixel values may be 0 or 255. Exemplary video frames, binary motion images, and motion history images are shown in FIG. 4.

The binary motion image 312 is fed into a MHI updating module 314 which produces a motion history image. In the case where each frame of a video sequence is subsequently fed into the system 300, the output is a motion history image for each frame. The MHI updating module 314 also takes as an input the previously-calculated motion history image.

In one embodiment, the binary motion image 312 takes values of zero or one and the motion history image 318 takes integer values between 0 and 255. In this embodiment, one method of calculating the motion history image 318 is herein described. If the value of the binary motion image 312 at a given pixel location is one, the value of the motion history image 318 at that pixel location is 255. If the value of the binary motion image 312 at a given pixel location is zero, the value of the motion history image 318 is the previous value of the motion history image 320 minus some value, which may be denoted delta. If, at some pixel, the value of the calculated motion history image 318 would be negative, it is instead set to zero. In this way, motion which happened far in the past is represented in the motion history image 318, however, it is not as intense as motion which happened more recently. In one particular embodiment, delta is equal to one. However, delta may be equal to any integer value in this embodiment. In other embodiments, delta may have non-integer values or be negative. In another embodiment, if the value of the binary motion image 312 at a given pixel location is zero, the value of the motion history image 318 is the previous value of the motion history image 320 multiplied by some value, which may be denoted alpha. In this way, the history of motion decays from the motion history image 318. For example, alpha may be one-half. Alpha may also be nine-tenths or any value between zero and one.

The motion history image 318 output from the system 300, but is also input into a delay 316 to produce the previously-calculated motion history image 320 used by the MHI updater 314.

FIG. 4 is a diagram of a collection of frames of a video sequence, the associated binary motion images, and the motion history image of easy frame. Four data frames 450a, 450b, 450c, 450d are shown, which represent a video sequence of an object 402 moving across the screen from left to right. The first two video frames 450a and 450b are used to calculate a binary motion image 460b. Described above is a system and method of producing a binary motion image 460b and motion history image 470b from two video frames. The first binary motion image 460b shows two regions of motion 404, 406. Each region corresponds to either the left of the right side of the object 402. The calculated motion history image 470b is identical to the binary motion image 460b as there is no previously-calculated motion history image. Alternatively, the previously-calculated motion history image can be assumed to be all zeros. Motion history image 470b shows regions 416, 418 corresponding to regions 406, 406 of the binary motion image 460b. The second frame 450b used in the calculation of the first motion history image 470b becomes the first frame used in the calculation of the second motion history image 470c. Using the two video frames 460b and 460c, a binary motion image 460c is formed. Again, there are two regions of motion 408, 410 corresponding to the left and right side of the object. The motion history image 470c is the binary motion image 460c superimposed over a "faded" version of the previously-calculated motion history image 470b. Thus regions 422 and 426 correspond to the regions 416 and 418, whereas the regions 420 and 424 correspond to the regions 408 and 410 of the binary motion image 460c. Similarly, a binary motion image 460d and motion history image 470d are calculated using video frames 450c and 450d. The motion history image 470d seems to show a "trail" of the objects motion.

Motion Center Determination

Figure 5:
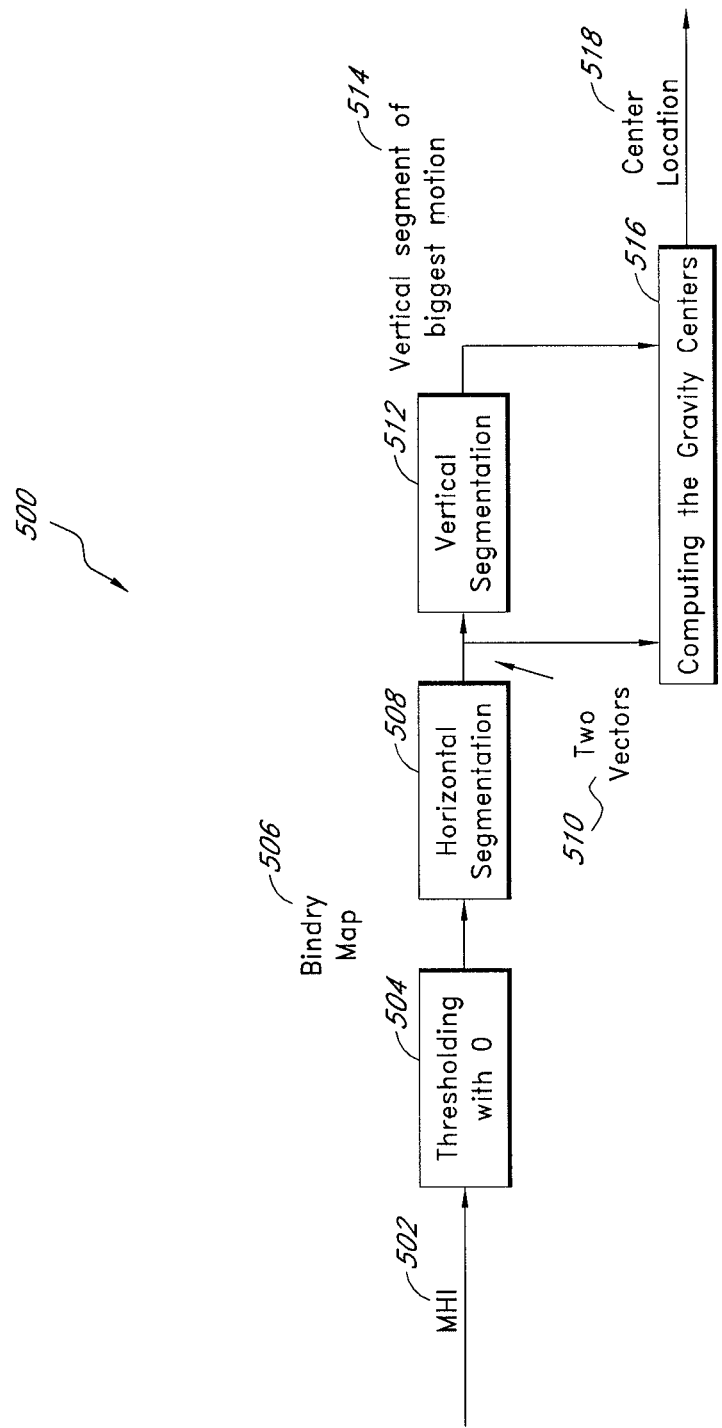
FIG. 5 is a functional block diagram of an embodiment of a system which determines one or more motion centers.

FIG. 5 is a functional block diagram of an embodiment of a system which determines one or more motion centers. The motion history image 502 is input to the system 500. The motion history image 502 is input into a thresholding module 504 to produce a binary map 506. The thresholding module 504 compares the value of the motion history image 302 at each pixel to a threshold. If the value of the motion history image 502 at a certain pixel location is greater than the threshold, the value of the binary map 506 at that pixel location is set to one. If the motion history image 502 at a certain pixel location is less than the threshold, the value of the binary map 506 at that pixel location is set to zero. The threshold may be any value, for example, 100, 128, or 200. The threshold may also be variable depending on the motion history image, or other parameters derived from the video sequence. An exemplary binary map is shown in FIG. 6.

Motion segmentation is performed in two steps, horizontal segmentation, and vertical segmentation. The horizontal segmentation 508 selects a line segment of moving area within that line, yielding an output of two values: start position and length of the segment. The horizontal segmentation 508 may also output two values: start position and end position. Each row of the binary map 506 is analyzed by the horizontal segmentation module 508. In one embodiment, for each row of the binary map 506, two values are output: the start position of the longest horizontal segment, and the length of the longest horizontal segment. Alternatively, the two output values may be the start position of the longest horizontal segment and the stop position of the longest horizontal segment. In other embodiments, the horizontal segmentation module 508 may output values associated with more than one horizontal segment.

A horizontal segment, in one embodiment, is a series of ones in a row of a binary map. The row of the binary map may undergo pre-processing before horizontal segments are identified. For example, if a single zero is found in the middle of a long string of ones, the zero may be flipped and set to one. Such a "lone" zero may be adjacent to other zeros in the image, but not in the row of the image. Also, a zero, may be considered a lone zero if it is at the edge of an image and not followed or preceded by another zero. More generally, if a series of zeros have a longer series of ones on either side, the entire series of zeros may be set to one. In other embodiments, the neighboring series of ones may be required to be twice as long as the series of zeros for flipping to take place. This, and other pre-processing methods, reduce noise in the binary map.

The two resultant vectors 510 from the horizontal segmentation, e.g. the start position and length of the longest horizontal segment for each row of the binary map, are input into the vertical segmentation module 512. In the vertical segmentation module 512, which may be a separate module or part of the horizontal segmentation module 508, each row of the binary map is marked as 1 if the length of the longest horizontal segment is greater than a threshold, and 0 otherwise. Two consecutive is in this sequence are considered connected if the two corresponding horizontal segments have an overlap exceeding some value. The overlap can be calculated using the start position and length of the respective motion segments. In one embodiment, an overlap of 30% is used to indicate that consecutive horizontal segments are connected. Such a connection is transitive, e.g. a third consecutive 1 in the sequence may be connected to the first two. Each sequence of connected 1s defines a vertical segment. A size is associated with each vertical segment. The size may be, in one embodiment, the number of connected 1s, e.g. the length of the vertical segment. The size may also be the number of pixels associated with the vertical segment, calculable from the lengths of the horizontal segments. The size may also be the number of pixels associated with the vertical segment having some characteristic, such as a color similar to a skin tone, thus enabling tracking of human hands.

The vertical segment (or segments) with the greatest size 514, as well as the vectors 510 from the horizontal segmentation module 508 and the MHI 502 are input into a motion center computation module 516. The output of the motion center computation module 516 is a location associated with each input vertical segment. The location may correspond to a pixel location, or may be between pixels. The motion center, in one embodiment, is defined as a weighted average of the pixel locations associated with the vertical segment. In one embodiment, the weight of a pixel is the value of the motion history image at that pixel location if the value of the motion history image is above a threshold and zero otherwise. In other embodiments, the weight of a pixel is uniform, e.g. 1, for each pixel.

FIG. 6 is a diagram of a binary map which may be utilized in performing one or more of the methods described herein. The binary map 600 is first input into a horizontal segmentation module 508 which identifies the horizontal segments of each row of the binary map. The module 508 then produces outputs defining the start location and length of the longest horizontal segment for each row. For row 0 of FIG. 6, there are no horizontal segments, as the binary map is composed of all zeros. In row 1, there are two horizontal segments, one starting at index 0 of length 3, and another starting at index 10 of length 4. In some embodiments, the horizontal segmentation module 508 could output both of these horizontal segments. In other embodiments, only the longest horizontal segment (e.g., the one starting at index 10) is output. In row 2, there are either one, two, or three horizontal segments depending on the embodiment of the system used. In one embodiment, lone zeros surrounded by ones (such as the zero at index 17) are changed into ones before processing. In another embodiment, sequences of zeros surrounded by longer sequences of ones (such as the sequence of two zeros at indices 7 and 8) are changed into ones before processing. In such an embodiment, one horizontal segment starting at index 4 of length 17 is identified. Identified horizontal segments, using one embodiment of the invention, are indicated in FIG. 6 by underline. Also, each row is marked either 1 or 0 on the right of the binary map if the longest horizontal segment is of length five or more. In other embodiments, a different threshold may be used. The threshold may also change depending on characteristics of other rows, e.g., neighboring rows.

Multiple Motion Center Determination

Another aspect of the development is a method of associating motion centers with identified objects in each frame of a provided video stream by sequentially performing horizontal and vertical segmentation of a motion history image, identifying the relevant objects, and associating motion centers with each of those objects.

In one embodiment, the three largest moving objects are identified and motion centers are associated with those objects for each frame of a video sequence. The invention should not be limited to the three largest moving objects, since any number of objects could be identified. For example, only two objects, or more than three objects could be identified. In some embodiments, the number of objects identified varies throughout the video sequence. For example, in one portion of a video sequence two objects are identified and in another portion, four objects are identified.

Figure 7:
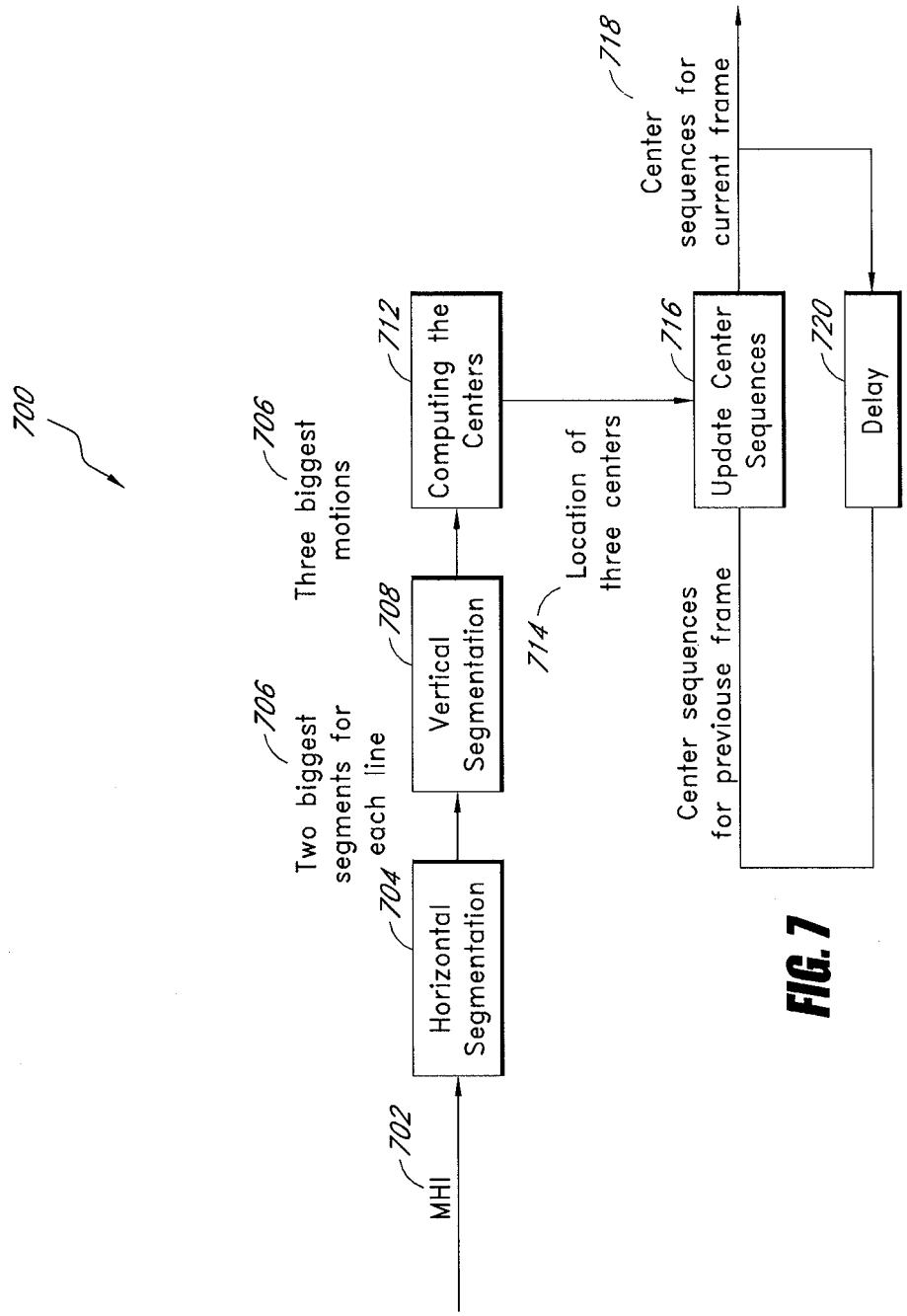
FIG. 7 is a functional block diagram of another embodiment of a system which determines one or more motion centers.

FIG. 7 is a functional block diagram illustrating a system capable of determining one or more motion centers in a video sequence. The system 700 comprises a horizontal segmentation module 704, a vertical segmentation module 708, a motion center computation module 712, a center updating module 716, and a delay module 720. The horizontal segmentation module 704 receives a motion history image 702 as an input, and produces horizontal segments 706 for each row of the motion history image 702. In one embodiment, the two largest horizontal segments are output. In other embodiments, more or less than two horizontal segments may be output. In one embodiment, each row of the motion history image 702 is processed as follows: a median filter is applied, the monotonic changing segments are identified, start points and lengths are identified for each segment, adjacent segments coming from the same objects are combined, and the largest segments are identified and output. This processing may be performed by the horizontal segmentation module 704. Other modules shown or not shown may also be employed in performing steps of the processing.

The vertical segmentation module 708 receives the horizontal segments 706 as an input, and outputs object motions 710. In one embodiment, the three largest object motions are output. In other embodiments more or less than three object motions may be output. In one embodiment, only the largest object motion is output. The object motions 710 are input into the motion center determining module 712 which outputs motion centers 714 for each of the object motions 710. The process of determining the motion centers in the determining module 712 is explained hereinafter. The newly determined motion centers 714, along with information previously determined associating motion centers and object motions 722, are used by the center updating module 716 to associate the newly calculated motion centers 714 with the object motions.

Figure 8:
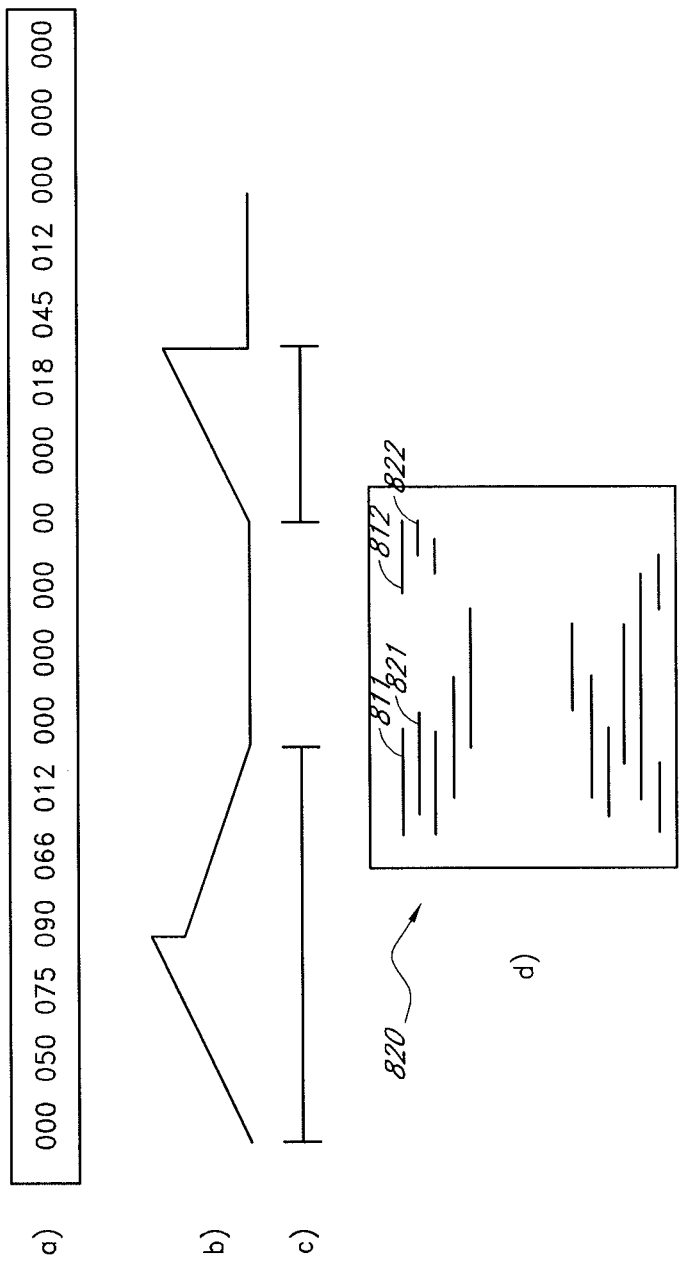

Horizontal segmentation, according to one embodiment of the development, may best be understood by means of an example. FIG. 8*a* is an exemplary row of a motion history image. FIG. 8*b* is diagram which represents the row of the motion history image of FIG. 8*a* as monotonic segments. FIG. 8*c* is a diagram illustrating two segments derived from the row of the motion history image of FIG. 8*a*. FIG. 8*d* is a diagram illustrating a plurality of segments derived from an exemplary motion history image. Each row of the motion history image may be processed by the horizontal segmentation module 804 shown in FIG. 8. In one embodiment, a median filter is applied to the row of the motion history image as part of the processing. The median filter may smooth the row and remove noise. The exemplary row of FIG. 8*a* can also be represented as a collection of monotonic segments as shown in FIG. 8*b*. The first segment, corresponding to the first four elements in the exemplary row, is monotonically increasing. This segment is followed immediately by a monotonically decreasing segment corresponding to the next three elements in the exemplary row. Another monotonic segment is identified in the latter half of the row. Adjacent, or near-adjacent, monotonic segments likely coming from the same object may be combined into a single segment for the purposes of further processing. In the example shown in FIG. 8, two segments are identified. The start location and length of these identified segments may be saved into a memory. Further information about the segments may be ascertained by further analyzes of the segments. For example, the number of pixels in the segment having a certain characteristic may be identified. In one embodiment, the number of pixels in the segment having a color characteristic, such as a skin tone, may be ascertained and stored.

FIG. 8*d* shows an exemplary result of the horizontal segmentation applied to many rows of the motion history image. Vertical segmentation may be performed to associated horizontal segments in different rows. For example, on the second row 820 of FIG. 8*d*, there are two identified segments 821 and 822, each segment overlapping a significant number of columns with a different segment of the row above 811 and 812. The decision to associate two segments in different rows may be based on any of a number of characteristics of the segments, for example, how much they overlap one another. This process of association, or vertical segmentation, as applied to the example of FIG. 8*d*, results in defining three object motions, a first motion corresponding to motion in the upper left, a second in the upper right, and a third towards the bottom of the motion history image.

In some embodiments, more than one segment in a row may be associated with a single segment in an adjacent row, thus the vertical segmentation processing need not be one-to-one. In other embodiments, processing rules may be in place to ensure one-to-one matching to simplify processing. Each object motion may be associated with a pixel number count, or a count of the number of pixels with a certain characteristic. In other applications of the method, more or less than three object motions may be identified.

For each object motion, a motion center is defined. The motion center may be calculated, for example, as a weighted average of the pixel locations associated with the object motion. The weight may be uniform or based on a certain characteristic of the pixel. For example, pixels having a skin tone matching a person may be given more weight than, for example, blue pixels.

The motion centers are each associated with an object motion which corresponds to an object captured by the video sequence. The motion centers identified in each image may be associated appropriately to the object from which they derive. For example, if a video sequence is of two cars passing each other in opposite directions, it may be advantageous to track a motion center of each vehicle. In this example, two motion centers would approach each other and cross. In some embodiments, the motion centers may be calculated from top to bottom and from left to right, thus the first motion center calculated may correspond to the first vehicle in the first half of the sequence and the second vehicle after the vehicles have passed each other. By tracking the motion centers, each motion center may be associated with an object, irrespective of the relative locations of the objects.

In one embodiment, a derived motion center is associated with the same object as a previously-derived motion center if the distance between them is below a threshold. In another embodiment, a derived motion center is associated with the same object as the nearest previously-derived motion center. In yet another embodiment, trajectories of the objects, based on previously-derived motion history may be used to anticipate where a motion center may be, and if a derived motion center is near this location, the motion center is associated with the object. Other embodiments may employ other uses of trajectory.

CONCLUSION

The systems and methods described above analyze the motion of objects within a series of images. Motion centers have a number of practical applications. In one application, the video sequence corresponds to hand gestures. The motion of a person's hands can be tracked using the methods disclosed to act as part of a human-machine interface. Instructions for scrolling in a text document or a webpage, for example, may be given by a user by moving the user's hand in an up or down motion. More information about using hand gestures as part of a user interface are disclosed in U.S. patent application Ser. No. 12/037,033, entitled "System and method for television control using hand gestures," filed Feb. 25, 2008, which is herein incorporated by reference in its entirety.

In another application, the motion of a person's hands and head may be analyzed to control a computer avatar in a computer game, such as a boxing simulation. Motion centers may also be used to analyze scientific data, such as astronomical data. Detection of near-earth objects (NEOs), such as asteroids, comets, or satellites, may be made simpler using motion center analysis of large amounts of data that may take too much computer processing power to analyze otherwise.

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

What is claimed is:

1. A method of defining a motion center in a video sequence, the method comprising:
receiving the video sequence of frames;
receiving a motion history image for each of a subset of the frames based on the video sequence;
identifying, through use of the motion history image, a first data segment having a first orientation, a start location, and a length;
identifying, a second data segment having a greatest size and a second orientation, wherein each element of the second data segment is associated with the first data segment; and
defining a corresponding motion center for the second data segment with the greatest size.

2. The method of claim 1, wherein receiving the motion history image for each of the subset of the frames includes receiving the motion history image for each of the frames.

3. The method of claim 1, wherein receiving the motion history image includes:
obtaining a difference image based on pixel values in one of the frames and those of a previous frame;
applying a threshold to the difference image to produce a binary motion image; and
obtaining the motion history image based on the binary motion image and a motion history image obtained for the previous frame.

4. The method of claim 3, wherein obtaining the difference image includes setting the pixel values of the difference image to an absolute value of a difference of a corresponding pixel value of the one of the frames and a corresponding pixel value of the previous frame.

5. The method of claim 3, wherein obtaining the motion history image includes:
setting the pixel values of the motion history image to a first value when a corresponding pixel value of the binary motion image is a second value; and
setting the pixel values of the motion history image to a corresponding pixel value of the motion history image obtained for the previous frame diminished by a defined factor.

6. The method of claim 5, wherein the motion history image obtained for the previous frame diminished by the defined factor is the motion history image obtained for the previous frame minus a fixed value.

7. The method of claim 5, wherein the motion history image obtained for the previous frame diminished by the defined factor is the motion history image obtained for the previous frame multiplied by a fixed value.

8. The method of claim 1, wherein identifying the first data segment includes applying a first threshold to the motion history image to produce a binary map.

9. The method of claim 8, wherein the first data segment is a series of ones in a row of the binary map.

10. The method of claim 8, wherein identifying the first data segment includes pre-processing of the binary map.

11. The method of claim 10, wherein pre-processing of the binary map includes changing a lone zero into a one.

12. The method of claim 10, wherein pre-processing of the binary map includes changing a sequence of zeros into a sequence of ones when the sequence of zeros is preceded and followed by a sequence of ones having a length greater than a second threshold based on a length of the sequence of zeros.

13. The method of claim 12, wherein the second threshold is twice a length of the sequence of zeros.

14. The method of claim 8, wherein each element of the second data segment is associated with the first data segment connected to another data segment having the first orientation which is also an element of the second data segment.

15. The method of claim 14, wherein the first data segment and the another data segment are connected when a number of columns in common between the first data segment and the another data segment is greater than or equal to a second threshold.

16. The method of claim 15, wherein the second threshold is based on a length of the first data segment.

17. The method of claim 16, wherein the second threshold is about 30% of a length of the shorter of the first data segment and the another data segment.

18. The method of claim 8, wherein identifying the second data segment includes marking each row of the binary map as either 1 or 0.

19. The method of claim 18, wherein the row is labeled as 1 when a length of a longest data segment having the first orientation is greater than a second threshold, and the row is labeled as 0 when the length of the longest data segment is not greater than the second threshold.

20. The method of claim 19, wherein the second data segment is a sequence of connected rows labeled as 1.

21. The method of claim 20, wherein the connected rows are two rows connected when a number of columns in common between the longest data segment associated with each of the rows is greater than or equal to the second threshold.

22. The method of claim 1, wherein identifying the first data segment includes:
  applying a median filter to a row to the motion history image;
  identifying monotonic data segments of the row; and
  combining adjacent data segments corresponding to motion of the same object.

23. The method of claim 1, wherein defining the corresponding motion center includes taking a weighted average of locations of all pixels associated with a given data segment having the second orientation.

24. The method of claim 23, wherein the weighted average is uniform for each pixel.

25. The method of claim 23, wherein the weighted average is based on the motion history image.

26. The method of claim 1, wherein the first orientation is perpendicular to the second orientation.

27. The method of claim 26, wherein the first orientation is vertical and the second orientation is horizontal.

28. The method of claim 26, wherein the first orientation is horizontal and the second orientation is vertical.

29. A system for defining a motion center in a video sequence, the system comprising:
  an input configured to receive the video sequence of frames;
  a motion history image module configured to receive a motion history image for each of a subset of the frames based on the video sequence;
  a first segmentation module configured to identify, through use of the motion history image, a first data segment having a first orientation, a start location, and a length;
  a second segmentation module configured to identify a second data segment having greatest size and a second orientation, wherein each element of the second data segment is associated with the first data segment; and
  a motion center module configured to define a corresponding motion center for the second data segment with the greatest size.

30. The system of claim 29, wherein the input is a digital video camera.

31. The system of claim 29, wherein the input is a memory access module configured to receive the video sequence from a memory.

32. The system of claim 29, wherein the motion history image module is a module configured to process the received video sequence to determine the motion history image.

33. The system of claim 29, wherein the motion history image module is configured to receive a pre-determined motion history image.

34. The system of claim 29, further comprising an output configured to display the motion center.

35. The system of claim 29, further comprising a storage module configured to store the motion center in a memory.

36. A system for defining a motion center in a video sequence, the system comprising:
  means for receiving the video sequence of frames;
  means for receiving a motion history image for each of a subset of the frames based on the video sequence;
  means for identifying, through use of the motion history image, a first data segment having a first orientation, a start location, and a length;
  means for identifying, a second data segment having a greatest size and a second orientation, wherein each element of the second data segment is associated with the first data segment; and
  means for defining a corresponding motion center for the second data segment with the greatest size.

37. A programmable storage device comprising code which, when executed, causes a processor to perform a method of defining a motion center in a video sequence, the method comprising:
  receiving the video sequence of frames;
  receiving a motion history image for each of a subset of the frames based on the video sequence;
  identifying, through use of the motion history image, a first data segment having a first orientation, a start location, and a length;
  identifying, a second data segment having a greatest size and a second orientation, wherein each element of the second data segment is associated with the first data segment; and
  defining a corresponding motion center for the second data segment with the greatest size.

* * * * *